10 US008705932B2

(12) United States Patent
Medhurst et al.

(10) Patent No.: US 8,705,932 B2
(45) Date of Patent: Apr. 22, 2014

(54) METHOD AND SYSTEM FOR DISPLAYING A TIMELINE

(75) Inventors: Kirsten A. Medhurst, Fresno, CA (US); Adrianus A. de Klerk, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 0 days.

(21) Appl. No.: 13/332,768

(22) Filed: Dec. 21, 2011

(65) Prior Publication Data

US 2013/0163956 A1   Jun. 27, 2013

(51) Int. Cl.
H04N 9/80   (2006.01)
H04N 5/93   (2006.01)
G11B 27/00  (2006.01)
H04N 5/76   (2006.01)
H04N 5/783  (2006.01)

(52) U.S. Cl.
USPC ........... 386/239; 386/240; 386/241; 386/243; 386/248; 386/282; 386/291; 386/292; 386/294; 386/343

(58) Field of Classification Search
USPC ......... 386/239, 240, 241, 243, 248, 282, 291, 386/292, 294, 343
See application file for complete search history.

(56) References Cited

U.S. PATENT DOCUMENTS

| 7,546,532 B1 | 6/2009 | Nichols et al. | |
| 2008/0148176 A1* | 6/2008 | Mita | 715/781 |
| 2008/0256450 A1 | 10/2008 | Takakura et al. | |
| 2009/0201314 A1* | 8/2009 | Tanaka et al. | 345/629 |
| 2010/0125791 A1* | 5/2010 | Katis et al. | 715/716 |
| 2012/0275770 A1* | 11/2012 | Tsai | 386/282 |

FOREIGN PATENT DOCUMENTS

| EP | 1 898 417 A2 | 3/2008 |
| FR | 2 940 481 | 6/2010 |

OTHER PUBLICATIONS

Notification of Transmittal of the International Search Report and the Written Opinion of the International Searching Authority or the Declaration; International Application No. PCT/US2012/070825; Date of Mailing: Feb. 26, 2013.

* cited by examiner

Primary Examiner — Daquan Zhao
(74) Attorney, Agent, or Firm — Hamilton, Brook, Smith & Reynolds, PC

(57) ABSTRACT

A method of displaying a timeline of recorded video comprising the steps of dividing the recorded video into timespans, providing a thumbnail and a timestamp for each timespan that has recorded video, providing a gap and a timestamp between thumbnails for each timespan in which there is no recorded video, displaying a first timeline containing the provided thumbnails and timestamps and the provided gaps and timestamps having an uncompressed format, receiving user input requesting that the first timeline be compressed, removing the gaps and their respective timestamps from the first timeline and moving the thumbnails and their timestamps located on either side of the gaps so that the thumbnails on either side of the gaps are adjacent to provide a compressed timeline, and displaying the compressed timeline.

12 Claims, 7 Drawing Sheets

METHOD AND SYSTEM FOR DISPLAYING A TIMELINE

BACKGROUND

The present application pertains generally to displaying and reviewing recorded video and, in particular, to displaying and reviewing recorded video via video timelines containing thumbnails. As used herein thumbnail means a video still, also known as a snapshot, sampled from a video recording, which represents a time bound segment of the video recording. Depending on the zoom setting on the timeline, each thumbnail may represent a different timespan, for example ranging from one minute to one hour to one day, of recorded video.

Using thumbnails to represent recorded video provides users with a direct, intuitive method for reviewing events. However, a thumbnail timeline presents several competing requirements. A user needs the thumbnails to be large enough so that he can perceive differences in the scene over time. The timeline also needs to be scaled with sufficient granularity so that a user can navigate with precision to a particular point in time. For example, a user may use a scrubber which is a vertical control that can be repositioned horizontally on the timeline. If a user moves the scrubber to the left, the video timeline is moved back in time thereby rewinding the video. If a user moves the scrubber to the right, the video timeline is moved forward in time thereby causing the video to fast-forward. The timeline needs to be proportional, with each thumbnail representing a known timespan so that the scrubbing navigation will feel natural and predictable.

A frequent requirement when reviewing security video is to locate footage of an event where the exact time of the incident is not known. A user comes to the system with a broad time frame and a more or less precise idea of what to look for. In this situation, displaying thumbnails that represent different points in a recorded sequence of events provides users with a direct, intuitive method for reviewing a video recording. The thumbnails provide guideposts, to help the user know where to position the scrubber. If the user sees something of interest, he can drag the scrubber to that point. As the user moves the scrubber along the timeline, the video in the workspace updates.

On the other hand, there may be gaps in the timeline because the video was set to record only on alarm or motion, or because the video has been pruned. In this case, the thumbnail size and timeline granularity would work against the interests of the user, requiring him to scrub at length or click several times to bypass the sections of timeline where no video is available. The user could zoom out to skip over the gaps, but then he must spend time zooming back in to view the fine-grained changes in the scene. Another option would be to program the interface to permanently hide the gaps in the video; however, this would result in losing the predictable linearity of the timeline and the power of the synchronized scrubbing.

Accordingly, there has been a need in the industry for a method and system for efficiently and effectively displaying and reviewing recorded video via timelines containing thumbnails when the video contains intermittent timespans without recorded video.

SUMMARY

An example of a method of displaying a timeline of recorded video includes the steps of dividing the recorded video into timespans, providing a thumbnail and a timestamp for each timespan that has recorded video, providing a gap and a timestamp between thumbnails for each timespan in which there is no recorded video, displaying a first timeline containing the provided thumbnails and timestamps and the provided gaps and timestamps having an uncompressed format, receiving user input requesting that the first timeline be compressed, removing the gaps and their respective timestamps from the first timeline and moving the thumbnails and their timestamps located on either side of the gaps so that the thumbnails on either side of the gaps are adjacent to provide a compressed timeline, and displaying the compressed timeline.

Implementations of such a method may include one or more of the following features. The method further includes providing an indicator where there was a gap so that the indicator is in between the thumbnails that were located on either side of the gap. The method further includes receiving input from a user requesting that the compressed timeline be changed to an uncompressed format. In the method the recorded video includes a first recorded video and a second recorded video and the step of dividing the recorded video into timespans comprises dividing the first recorded video and the second recorded video into timespans having the same length of time, the method further comprises determining timespans in which the first recorded video and the second recorded video each have a gap, and the step of removing the gaps and their respective timestamps from the first timeline and moving the thumbnails and their timestamps located on either side of the gaps comprises removing the gaps and their respective timestamps from the first timeline and moving the thumbnails and their timestamps located on either side of the gaps so that the thumbnails on either side of the gaps are adjacent to provide a compressed timeline for timespans in which the first recorded video and the second recorded video each have a gap.

An example of a system for displaying a timeline of recorded video includes memory for storing recorded video, an input for receiving user input, an output for providing a signal to a display, and a processor in communication with the memory, input and output, the processor being adapted to divide recorded video stored in the memory into timespans, provide a thumbnail and a timestamp for each timespan that has recorded video, provide a gap and a timestamp between thumbnails for each timespan in which there is no recorded video, generate a signal to display a first timeline containing the provided thumbnails and timestamps and the provided gaps and timestamps having an uncompressed format, provide the signal to the output, to receive user input on the input requesting that the first timeline be compressed, remove the gaps and their respective timestamps from the first timeline and move the thumbnails and their timestamps located on either side of the gaps so that the thumbnails on either side of the gaps are adjacent to provide a compressed timeline, and to provide a signal to the output to display the compressed timeline.

Implementations of such a system may include one or more of the following features. The processor is further adapted to provide an indicator where there was a gap so that the indicator is in between the thumbnails that were located on either side of the gap. The processor is further adapted to receive input from a user on the input requesting that the compressed timeline be changed to an uncompressed format. The recorded video includes a first recorded video and a second recorded video and wherein the processor is further adapted to divide the first recorded video and the second recorded video into timespans having the same length of time, to determine timespans in which the first recorded video and the second recorded video each have a gap, to remove the gaps and their respective timestamps from the first timeline and move the thumbnails and their timestamps located on either side of the gaps so that the thumbnails on either side of the gaps are adjacent to provide a compressed timeline for timespans in which the first recorded video and the second recorded video each have a gap, and to provide a signal to the output for displaying the compressed timeline.

An example of a non-transitory computer readable medium includes instructions configured to cause a processor to divide the recorded video into timespans, provide a thumbnail and a timestamp for each timespan that has recorded video, provide a gap and a timestamp between thumbnails for each timespan in which there is no recorded video, display a first timeline containing the provided thumbnails and timestamps and the provided gaps and timestamps having an uncompressed format, receive user input requesting that the first timeline be compressed, remove the gaps and their respective timestamps from the first timeline and moving the thumbnails and their timestamps located on either side of the gaps so that the thumbnails on either side of the gaps are adjacent to provide a compressed timeline; and display the compressed timeline.

Implementations of such a non-transitory computer readable medium may include one or more of the following features. The non-transitory computer readable medium includes further instructions configured to cause the processor to provide an indicator where there was a gap so that the indicator is in between the thumbnails that were located on either side of the gap. The non-transitory computer readable medium includes further instructions configured to cause the processor to receive input from a user requesting that the compressed timeline be changed to an uncompressed format. The recorded video includes a first recorded video and a second recorded video, the instructions configured to cause the processor to divide the recorded video into timespans includes instructions configured to cause the processor to divide the first recorded video and the second recorded video into timespans having the same length of time, the non-transitory computer readable medium includes further instructions configured to cause the processor to determine timespans in which the first recorded video and the second recorded video each have a gap, and the instructions configured to cause the processor to remove the gaps and their respective timestamps from the first timeline and to move the thumbnails and their timestamps located on either side of the gaps further comprises instructions configured to cause the processor to remove the gaps and their respective timestamps from the first timeline and to move the thumbnails and their timestamps located on either side of the gaps so that the thumbnails on either side of the gaps are adjacent to provide a compressed timeline for timespans in which the first recorded video and the second recorded video each have a gap.

The processes and systems described herein, and the attendant advantages, applications, and features thereof, will be more fully understood by a review of the following detailed description, figures, and claims.

DETAILED DESCRIPTION

Figure 1:
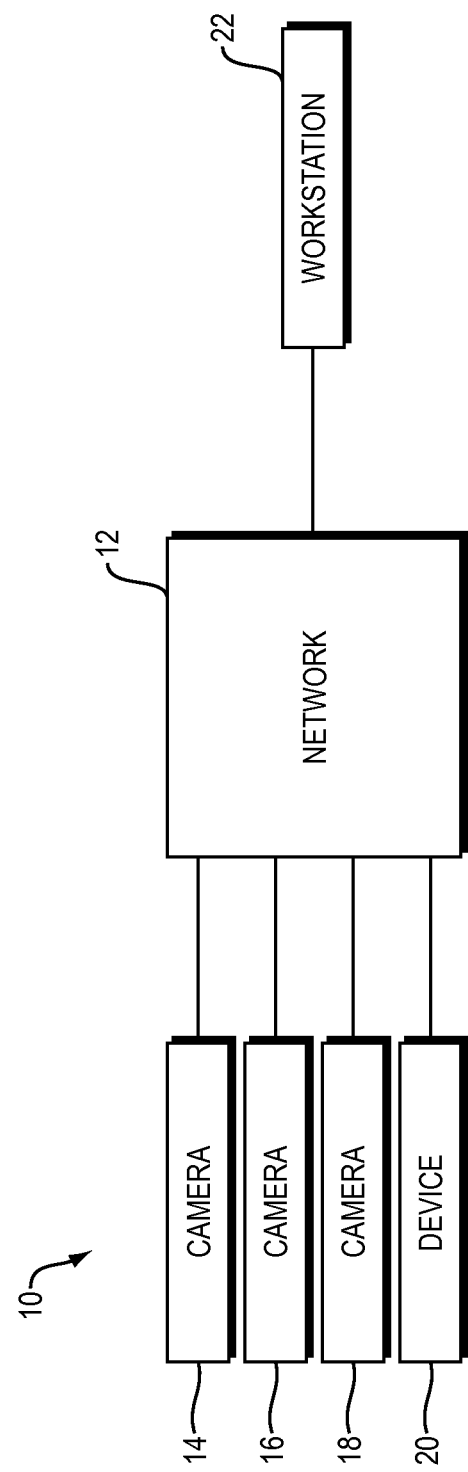
FIG. 1 is a block diagram of one embodiment of a surveillance system in which various aspects of displaying a timeline can be implemented.

Referring to FIG. 1, a video surveillance system 10 has a network 12 which can be a closed network, local area network, or wide area network, such as the Internet. A plurality of cameras 14, 16, and 18 are connected to network 12 to provide real-time video streams. Workstation 22, which can be, for example, a control point in surveillance system 10, a personal computer or a user logged into surveillance system 10 by means of a laptop computer, is connected to network 12. Device 20 is connected to network 12 and can be part of another workstation, control point, network manager, system storage, digital video recorder (DVR) or other suitable device. One or more of cameras 14, 16, and 18 can be a movable camera, such as a PTZ camera that allows a user to adjust the pan, tilt, and zoom of the camera and can have their own storage for storing presets and tour information. The video streams from cameras 14, 16, and 18 can be recorded and stored by either workstation 22 or device 20 or both for future display, review or analysis by a user.

Figure 2:
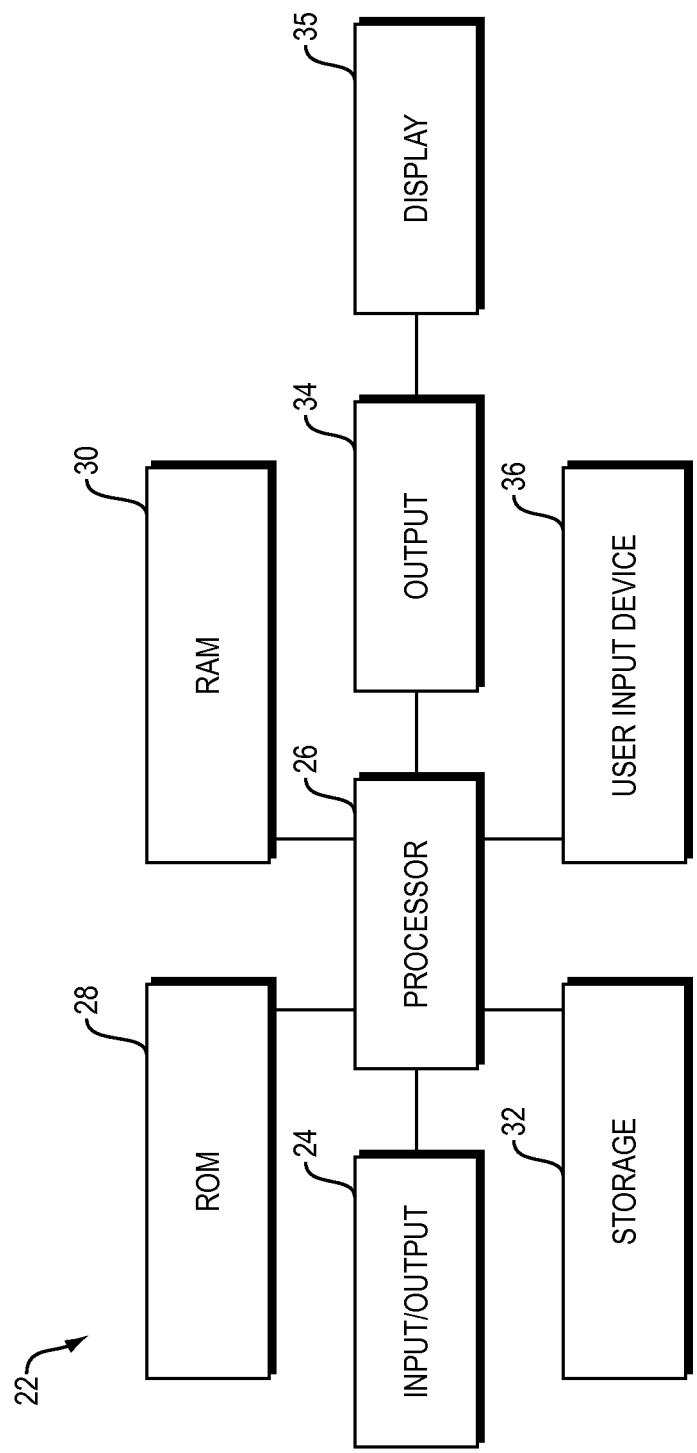
FIG. 2 is an exemplary block diagram of one embodiment of the workstation shown in FIG. 1.

With reference to FIG. 2, one embodiment of an exemplary workstation for performing various aspects of displaying recorded video streams received from one or more cameras is shown in block diagram form. Workstation 22 has a central or host processor 26 which is connected to input/output 24, ROM 28, RAM 30, output 34, video display 35, storage 32 and user input device 36. User input device 36 can be a keyboard, mouse, controller, or other suitable input device. Processor 26 implements algorithms and programs that are stored in ROM 28, storage 32, which could be a disk drive for example, or device 20, which is located elsewhere in network 12, in response to user input from user input device 36 and provides output signals to display 35. The video streams from cameras 14, 16, and 18 can be stored, for example, in workstation 22 or device 20. In addition, input/output 24 can receive signals from device 20, such as program code to implement various aspects of displaying a timeline for displaying a recorded video stream.

Figure 3:
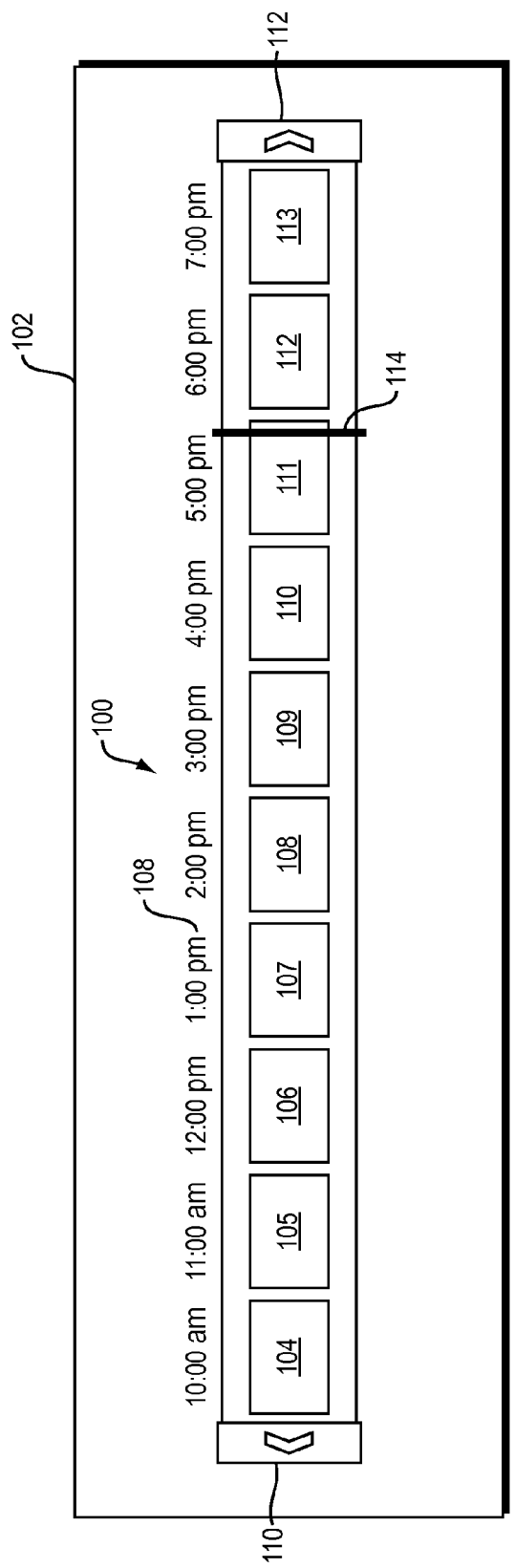
FIG. 3 is an exemplary screen shot illustrating one embodiment of a timeline.

Referring to FIG. 3, an exemplary timeline 100 is shown on display 102, which could be, for example, display 35 of workstation 22 as shown in FIG. 2. Timeline 100 has a plurality of thumbnails 104 through 113, each of which represent a time bound segment of the video recording from a single camera, such as, for example camera 12 in FIG. 1. Thumbnails 104-113 are illustrated as empty rectangular boxes; however, in an actual application each of thumbnails 104-113 are would contain a snapshot of the recorded video at the respective point in time. A scrubber 114 is a vertical control that can be repositioned horizontally by a user on timeline 100. If a user moves scrubber 114 to the left, timeline 100 is moved back in time thereby rewinding the video. If a user moves scrubber 114 to the right, timeline 100 is moved forward in time thereby causing the video to fast-forward. Timeline 100 is proportional with each of thumbnails 104-113 representing a known timespan indicated by the respective timestamps 108 located above the respective thumbnails so that the scrubbing navigation feels natural and predictable. For example, thumbnail 104 has a timestamp of 10:00 am and thumbnail 113 has a timestamp of 7:00 pm with each of the thumbnails in between having their respective hourly timestamp. However, it should be noted that the divisions of time do not have to be an hour; they can be, for example, day, hours, minutes, and seconds. It can be seen from timestamps 108 that each of thumbnails 104-113 represents a timespan of one hour. Timeline 100 has steppers 110 and 112 which are vertical controls that a user can click with a mouse to shift timeline 100 to the left or right, respectively, to show the last or next N thumbnails in timeline 100. Timeline 100 may have other controls, not shown, for interacting with thumbnails 104-113.

Figure 4:
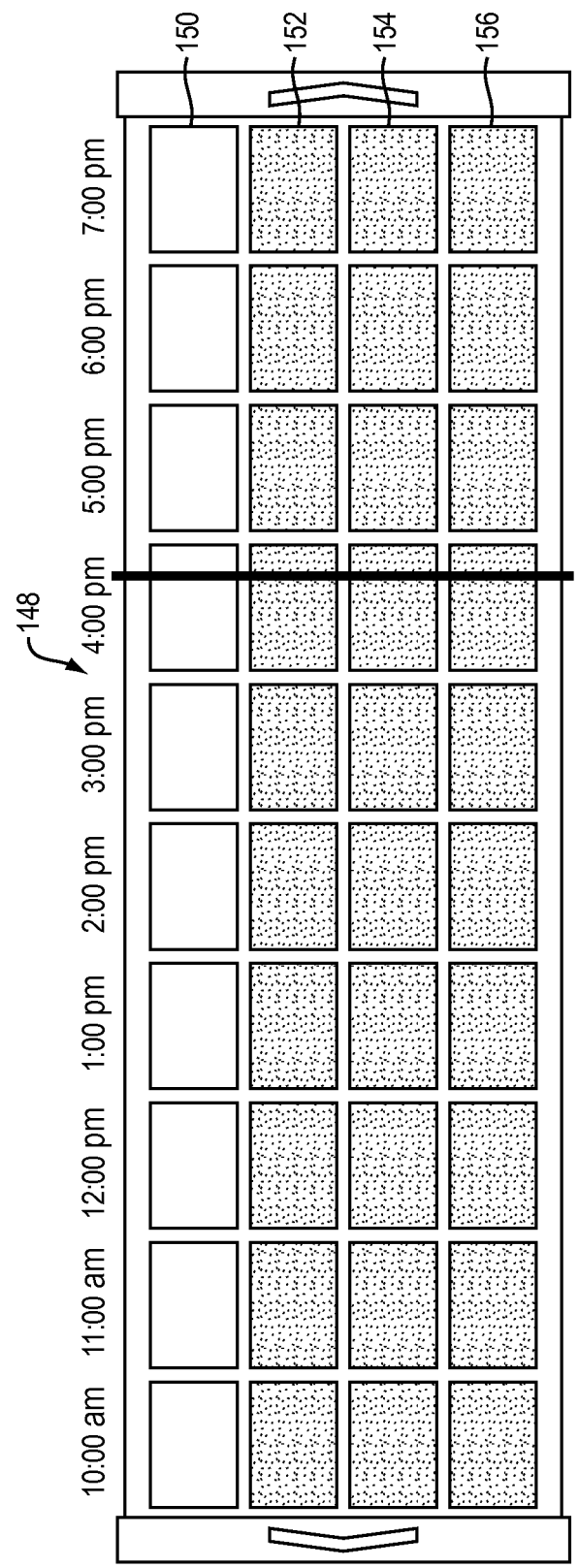
FIG. 4 is an exemplary screen shot illustrating one embodiment of a timeline.

The investigative value of timeline 100 increases significantly when additional cameras are added for synchronous searching especially where both the time of an incident and the location of an incident are unknown. FIG. 4 illustrates an exemplary timeline 148 in which four recorded video streams, 150, 152, 154, and 156 are displayed. In order to display timeline 148 on a typical workstation display, the thumbnails comprising the four recorded video streams cannot be too large because of the size limitation of the display screen. In addition, timeline 148 needs to be scaled with sufficient granularity so that a user can navigate, that is, scrub, with precision to a particular point in time.

To achieve all of these objectives, a timeline's zoom levels might be made adjustable. Zooming out displays a broader timespan and allows a user to observe major changes in the scene, for example, lights on or off, object present or missing, and so forth. Zooming in allows a user to drill down to a narrower timespan and see a more fine-grained set of thumbnails. This allows the user to navigate to the precise point where the event of interest occurs, before beginning the time-consuming and bandwidth-intensive task of playing back the video. However, the zoomable timeline solution becomes less effective when there are gaps in the video recording. These gaps might be caused by a recording schedule that captures video only at certain times of day or only when motion is detected or an alarm is triggered. Gaps might also occur, for example, when video is pruned, that is, garbage collected, based on an algorithm that determines whether video meets certain predetermined criteria to potentially be of interest and should be retained. In this case, the thumbnail size and timeline granularity would work against the interests of a user, requiring him to scrub at length or click several times to bypass the sections of timeline where no video is available.

Figure 5:
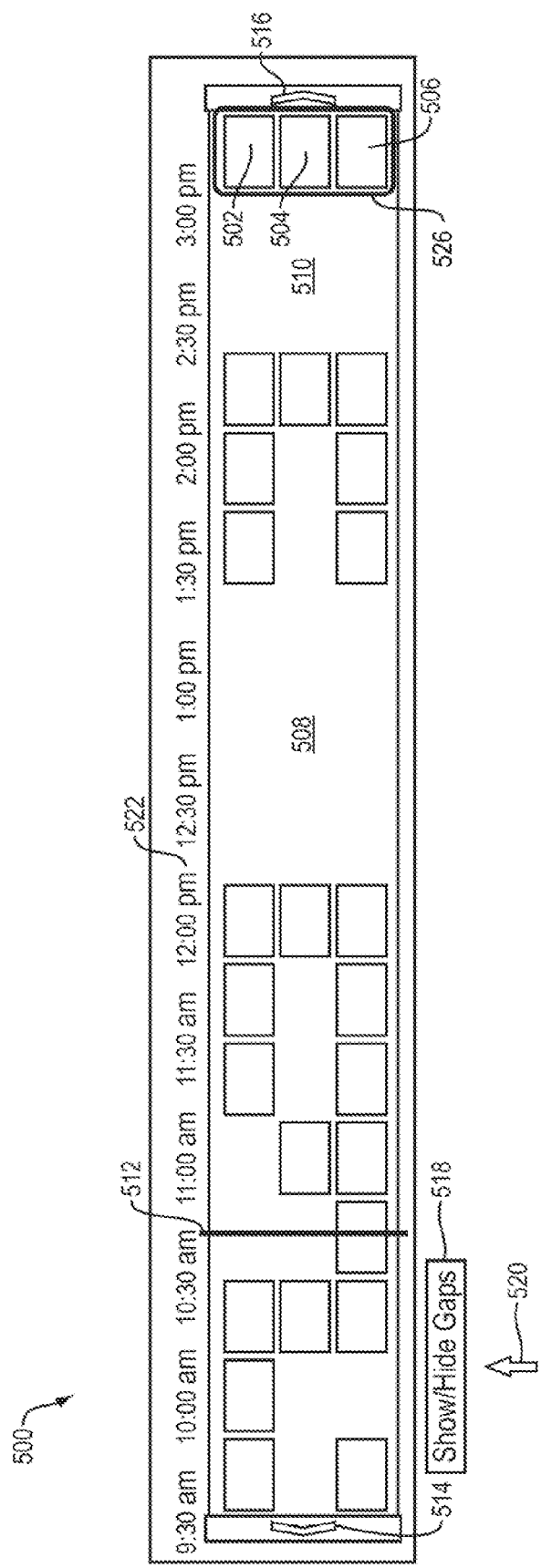
FIG. 5 is an exemplary screen shot illustrating one embodiment of a timeline that has not been compressed.

Referring to FIG. 5 an exemplary screen shot illustrating one embodiment of a timeline that has not been compressed is shown. Timeline 500 has three video streams 502, 504 and 506, which have thumbnails indicated by rectangular boxes as discussed above and empty spaces indicating that there is no video for that particular timespan. The time locations where there is no recorded video results in gaps in the individual streams. If there is a gap in each of the video streams during the same timespan, it results in corresponding gaps 508 and 510 in the recorded video data. Corresponding gaps 508 and 510 are defined in this exemplary illustration as timespans in which each of the video streams has a gap in video data at the same timespan. Numerous other video gaps are shown in FIG. 5, but these other video gaps do not have corresponding gaps in the recorded video data in each of the respective video streams during the same timespan. Timeline 500 has scrubber 512 and steppers 514 and 516 for navigating timeline 500 as discussed above. In addition, timeline 500 has button 518 that a user can interact with by moving mouse pointer 520 onto button 518 and clicking the mouse button to activate the function controlled by button 518. Button 518 enables a user to choose between an uncompressed timeline display having linear units of time in timestamps 522 with gaps or a compressed timeline display having nonlinear units of time in timestamps 522 but no corresponding gaps.

Figure 6:
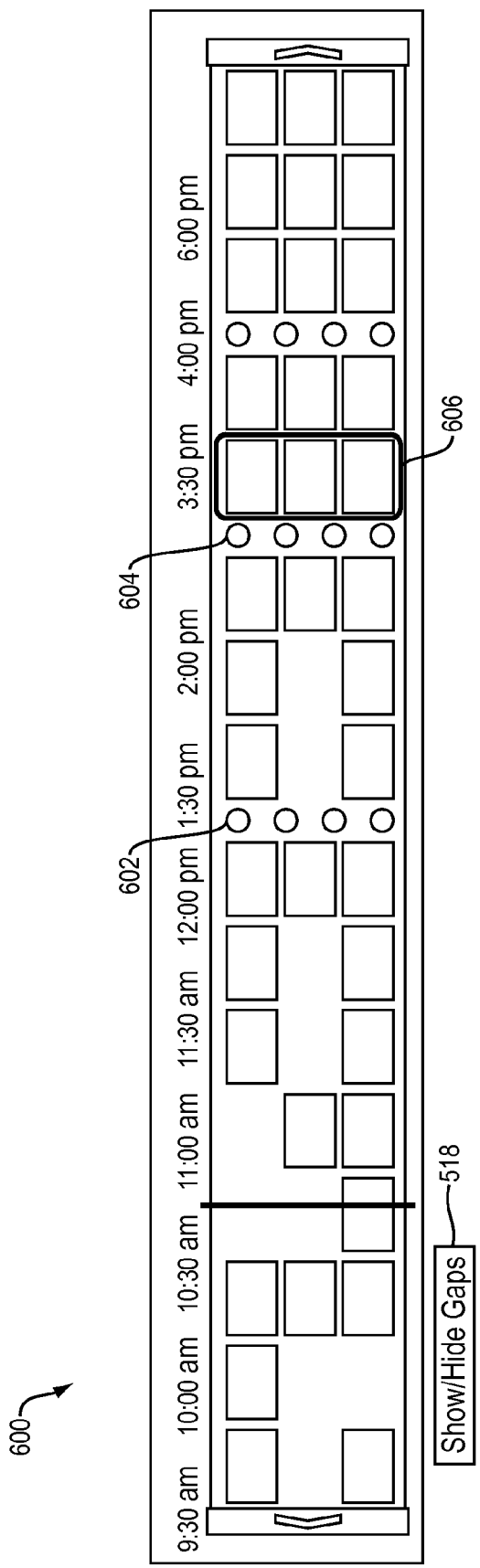
FIG. 6 is an exemplary screen shot illustrating one embodiment of a timeline that has been compressed.

FIG. 6 is an exemplary screen shot illustrating one embodiment of a timeline that has been compressed. Timeline 600 illustrates one embodiment of timeline 500 from FIG. 5 after it has been compressed in response to a user clicking button 518. Corresponding gaps 508 and 510 have been removed in timeline 600 and icons, that is, gap indicators 602 and 604, have been placed there to indicate to a user that the corresponding gaps have been removed. Gap indicators 602 and 604 have been shown as four small vertical circles as an illustrative example, but any symbol, geographic shape, line, and so forth could be used to alert the user to the fact that the display contains gaps that have been compressed so that the timeline 600 is not linear. Timeline 600 allows additional video data to be displayed as compared to timeline 500 and thereby allows a user to scrub quickly across expanses of time. The thumbnails circled and indicated by numeral 606 in FIG. 6 are the same thumbnails as those circled and indicated by numeral 526 in FIG. 5 except that they have been shifted to the left on the display because of the removal of the corresponding gaps and the resulting compression. The additional video data shown to the right of the thumbnails indicated by numeral 606 is merely exemplary of additional video data in the recorded video streams. If desired, a user could return to the time uncompressed timeline in FIG. 5 by clicking button 518, which allows a user to easily switch back and forth on the fly between the compressed and uncompressed timeline displays.

Aspects of the techniques and/or items described herein provide a user with a flexible method for viewing and navigating a video timeline. The uncompressed view provides a linear representation, and the compressed view allows a user to quickly navigate to the recorded video of interest.

Figure 7:
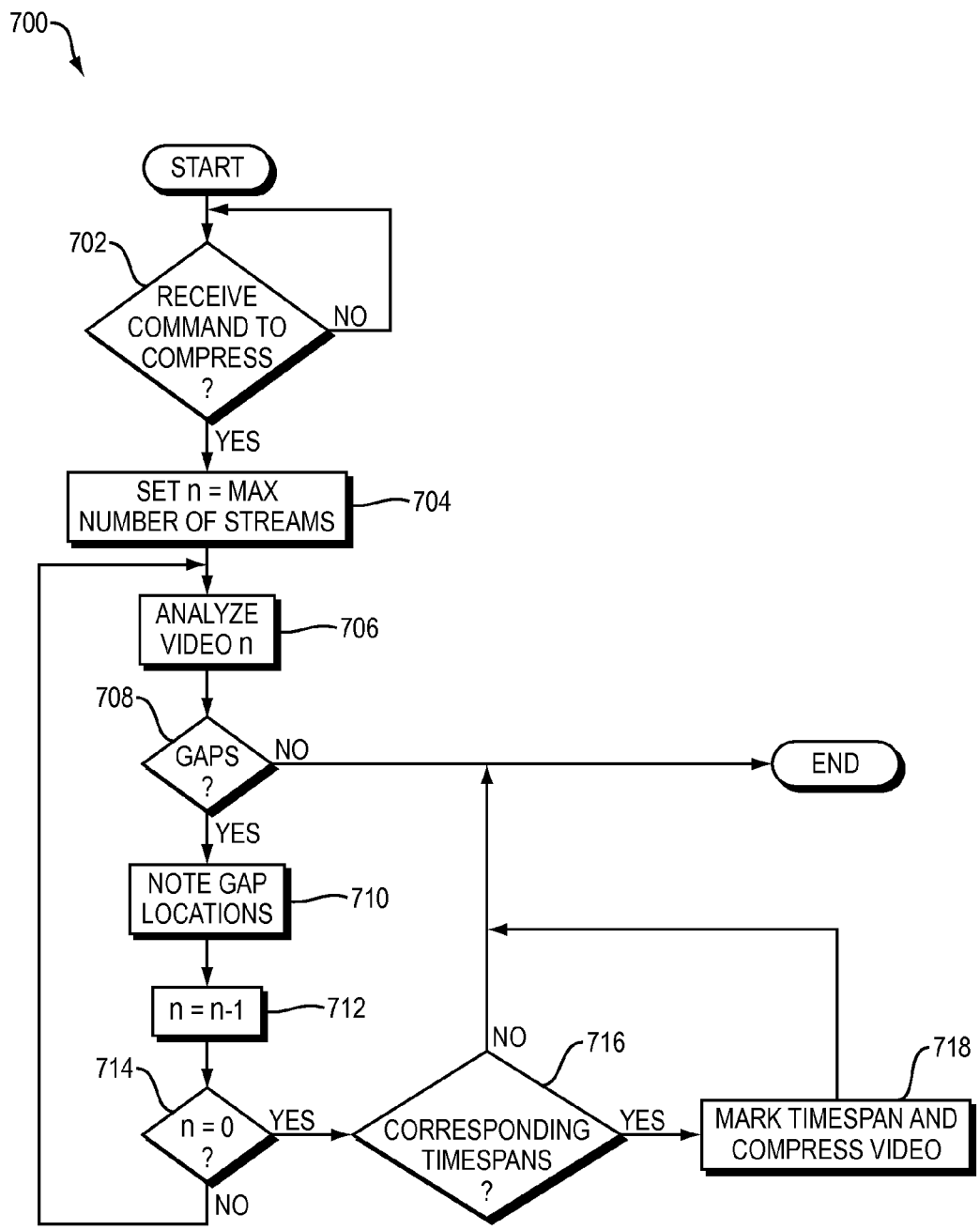
FIG. 7 is an exemplary flowchart for implementing one embodiment of a method for compressing a timeline.

FIG. 7 is an exemplary flowchart for implementing one embodiment of a method for compressing a timeline. Method 700 starts at decision point 702 where the method waits for a user input command indicating that the timeline should be compressed. If a command is received, then at block 704 n is set equal to the number of video streams that will be displayed in the timeline. At step 706 video n is analyzed to determine a gap or gaps in video n. At decision point 708 the system determines if there is a gap in video n. If the decision is no, the process is ended because as discussed above there must be a corresponding gap in all of the video streams that will be displayed in the timeline to be able to perform the compression. If there are gaps, then at step 710 the gap locations are noted. At step 712, n is set equal to n−1. At decision point 714 it is determined if n is equal to zero. If no, then the process returns to step 706 to process the next video stream to be displayed in the timeline. If n is equal to zero, then the process moves to decision point 716 where the method determines if there are any timespans where there are gaps for all of the video streams to be displayed in the timeline. If the answer is no, the process ends. If there is one or more corresponding gaps in all of the video streams, then at step 718 the process places a gap indicator at the corresponding gap locations and compresses the video streams. The process then proceeds to the end point, although it should be understood that throughout this discussion the results as indicated by the various steps in method 700 would then be provided to a display, such as display 35 in FIG. 2.

The processes and methods described and shown herein can be stored on a non-transitory computer readable medium, which refers to any non-transitory storage device used for storing data accessible by a computer, for example, a magnetic hard disk, a floppy disk, an optical disk, such as a CD-ROM or a DVD, a magnetic tape, and a memory chip. The various embodiments discussed herein have been in reference to use in displaying, viewing, and analyzing video data recorded by a video surveillance system; however, the same processes and methods can be utilized with cameras and video data captured by commercial and noncommercial systems outside of the surveillance Other examples of configuration and implementation are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including the claims, "or" as used in a list of items prefaced by "at least one of" indicates a disjunctive list such that, for example, a list of "at least one of A, B, or C" means A or B or C or AB or AC or BC or ABC (i.e., A and B and C). In addition, it is to be understood that more than one invention may be disclosed herein.

What is claimed is:

1. A method of displaying a timeline of recorded video, the method comprising:
    dividing the recorded video into timespans;
    providing a thumbnail and a timestamp for each timespan that has recorded video;
    providing a gap and a timestamp between thumbnails for each timespan in which there is no recorded video;
    displaying a first timeline containing the provided thumbnails and timestamps and the provided gaps and timestamps having an uncompressed format;
    receiving user input requesting that the first timeline be compressed;
    removing the gaps and their respective timestamps from the first timeline and moving the thumbnails and their timestamps located on either side of the gaps so that the thumbnails and timestamps on either side of the gaps are adjacent to provide a compressed timeline; and
    displaying the compressed timeline.

2. A method as recited in claim 1 further comprising:
    providing an indicator in the compressed timeline where there was a gap in the first timeline displayed in the uncompressed format so that the indicator is in between the thumbnails that were located on either side of the gap.

3. A method as recited in claim 2 further comprising:
    receiving input from a user requesting that the compressed timeline be changed to an uncompressed format.

4. A method as recited in claim 2 wherein the recorded video comprises a first recorded video and a second recorded video and wherein dividing the recorded video into timespans comprises dividing the first recorded video and the second recorded video into timespans having the same length of time; further comprises determining timespans in which the first recorded video and the second recorded video each have a gap; and wherein removing the gaps and their respective timestamps from the first timeline and moving the thumbnails and their timestamps located on either side of the gaps comprises removing the gaps and their respective timestamps from the first timeline and moving the thumbnails and their timestamps located on either side of the gaps so that the thumbnails on either side of the gaps are adjacent to provide a compressed timeline for timespans in which the first recorded video and the second recorded video each have a gap.

5. A system for displaying a timeline of recorded video comprising:
    memory for storing recorded video;
    an input for receiving user input;
    an output for providing a signal to a display; and
    a processor in communication with the memory, input and output, the processor being adapted to divide recorded video stored in the memory into timespans, provide a thumbnail and a timestamp for each timespan that has recorded video, provide a gap and a timestamp between thumbnails for each timespan in which there is no recorded video, generate a signal to display a first timeline containing the provided thumbnails and timestamps and the provided gaps and timestamps having an uncompressed format, provide the signal to the output, to receive user input on the input requesting that the first timeline be compressed, remove the gaps and their respective timestamps from the first timeline and move the thumbnails and their timestamps located on either side of the gaps so that the thumbnails and timestamps on either side of the gaps are adjacent to provide a compressed timeline, and to provide a signal to the output to display the compressed timeline.

6. A system as recited in claim 5 wherein the processor is further adapted to provide an indicator in the compressed timeline where there was a gap in the first timeline displayed in the uncompressed manner so that the indicator is in between the thumbnails that were located on either side of the gap.

7. A system as recited in claim 6 wherein the processor is further adapted to receive input from a user on the input requesting that the compressed timeline be changed to an uncompressed format.

8. A system as recited in claim 6 wherein the recorded video comprises a first recorded video and a second recorded video and wherein the processor is further adapted to divide the first recorded video and the second recorded video into timespans having the same length of time, to determine timespans in which the first recorded video and the second recorded video each have a gap, to remove the gaps and their respective timestamps from the first timeline and move the thumbnails and their timestamps located on either side of the gaps so that the thumbnails on either side of the gaps are adjacent to provide a compressed timeline for timespans in which the first recorded video and the second recorded video each have a gap, and to provide a signal to the output for displaying the compressed timeline.

9. A non-transitory computer readable medium having instructions stored thereon configured to cause a processor to:
    divide the recorded video into timespans;
    provide a thumbnail and a timestamp for each timespan that has recorded video;
    provide a gap and a timestamp between thumbnails for each timespan in which there is no recorded video;
    display a first timeline containing the provided thumbnails and timestamps and the provided gaps and timestamps having an uncompressed format;
    receive user input requesting that the first timeline be compressed;
    remove the gaps and their respective timestamps from the first timeline and move the thumbnails and their timestamps located on either side of the gaps so that the thumbnails and timestamps on either side of the gaps are adjacent to provide a compressed timeline; and display the compressed timeline.

10. A non-transitory computer readable medium as recited in claim 9 having further instructions stored thereon configured to cause the processor to provide an indicator in the compressed timeline where there was a gap in the first timeline displayed in the uncompressed manner so that the indicator is in between the thumbnails that were located on either side of the gap.

11. A non-transitory computer readable medium as recited in claim 10 having further instructions stored thereon configured to cause the processor to receive input from a user requesting that the compressed timeline be changed to an uncompressed format.

12. A non-transitory computer readable medium as recited in claim 10 wherein the recorded video comprises a first recorded video and a second recorded video and wherein the instructions configured to cause the processor to divide the recorded video into timespans comprises instructions configured to cause the processor to divide the first recorded video and the second recorded video into timespans having the same length of time; further instructions stored thereon configured to cause the processor to determine timespans in which the first recorded video and the second recorded video each have a gap; and wherein the instructions configured to cause the processor to remove the gaps and their respective timestamps from the first timeline and to move the thumbnails and their timestamps located on either side of the gaps further comprises instructions configured to cause the processor to remove the gaps and their respective timestamps from the first timeline and to move the thumbnails and their timestamps located on either side of the gaps so that the thumbnails on either side of the gaps are adjacent to provide a compressed timeline for timespans in which the first recorded video and the second recorded video each have a gap.

* * * * *